United States Patent [19]
Pan et al.

[11] Patent Number: 5,910,962
[45] Date of Patent: Jun. 8, 1999

[54] MULTIWAVELENGTH FIBER LASER SOURCES FOR FIBEROPTIC NETWORKS

[75] Inventors: Jing-Jong Pan, Milpitas; Yuan Shi, San Jose, both of Calif.

[73] Assignee: E-TEK Dynamics, Inc., San Jose, Calif.

[21] Appl. No.: 08/920,375

[22] Filed: Aug. 29, 1997

[51] Int. Cl.⁶ .................................................. H01S 3/07
[52] U.S. Cl. ............................ 372/6; 372/23; 372/71; 372/97; 385/24
[58] Field of Search ........................... 385/24, 37; 372/6, 372/68, 23, 69, 70, 71, 97

[56] References Cited

U.S. PATENT DOCUMENTS

| | | | |
|---|---|---|---|
| 5,524,118 | 6/1996 | Kim et al. ................................ | 372/6 |
| 5,564,832 | 10/1996 | Ball et al. ............................... | 372/6 X |
| 5,600,665 | 2/1997 | Minden et al. .......................... | 372/6 |

OTHER PUBLICATIONS

Agrawal, *Nonlinear Fiber Optics, Second Edition*, Chapter 12, pp. 539–540, Academic Press, 1995. [No Month].
Ball et al., "Nd³⁺ Fiber Laser Utilising Intra–Core Bragg Reflectors," *Electronics Letters* (Oct. 1990) 26:1829–1830.
Kashyap et al., "All–Fiber Narrowband Reflection Gratings at 1500 nm," *Electronics Letters* (May 1990) 26:730–731.
Ball et al., "Standing–Wave Monomode Erbium Fiber Laser," *IEEE Photonics Technology Letters* (Jul. 1991) vol.: 613–615.
Sejka et al., "Distributed feedback Er³⁺ –doped fibre laser," *Electronics Letters* (Aug. 1995) 31:1445–1446.

*Primary Examiner*—John D. Lee
*Attorney, Agent, or Firm*—Townsend and Townsend and Crew LLP

[57] ABSTRACT

The present invention provides for multiple wavelength laser sources. The laser source has a pumping laser generating output at a wavelength, typically below 1500 nm, and a plurality of DBR fiber lasers or DFB fiber lasers, each having an output which is centered at a selected wavelength in the 1550 nm range. The fiber lasers are connected to the pumping laser such that the output light from said first pumping laser provides lasing energy for each of said fiber lasers. The fiber lasers may be connected serially or in series to each other. An optical fiber amplifier may be connected to the output of the serially-connected fiber lasers, or to the output of each one of the parallel-connected fiber lasers, to amplify the output from the fiber lasers so that the pumping laser provides energy for both the fiber lasers and the optical fiber amplifier.

29 Claims, 4 Drawing Sheets

… … …

MULTIWAVELENGTH FIBER LASER SOURCES FOR FIBEROPTIC NETWORKS

BACKGROUND OF THE INVENTION

The present invention is related to the field of laser sources for fiberoptic networks and, more particularly, to lasing elements created in a doped optical fiber.

As the use of fiberoptic networks have become more prevalent in telecommunications, the number of fiberoptic light sources has rapidly increased. Semiconductor lasers are commonly used for these sources. WDM (Wavelength Division Multiplexed) networks, in particular, demand a large number of laser sources for signal generation. Since the wavelength of an optical signal is used to direct the signal from its source to its destination, each user typically has a laser source operating at a specific wavelength different from other laser sources. A stable laser source having a fixed output wavelength is very desirable. Furthermore, an emerging standard is Dense WDM proposed by the ITU, the International Telecommunications Union, in which the separation between communication channels is only 0.8 nm in wavelength, or 100 GHz in frequency. Thus light source(s) for such a network must also offer a precise selection of wavelengths and a very narrow output linewidth for each selected wavelength, i.e., the wavelength of the output signal must be concentrated in a very narrow portion of the optical spectrum.

New types of laser source are fiber lasers which may be a Distributed Bragg Reflector (DBR) fiber laser or a Distributed Feedback (DFB) fiber laser. In each fiber laser source a rare-earth element doped optical fiber section is coupled to one or more fiber Bragg gratings so as to lase at one or more selected output wavelengths. In a fiber laser source, a pumping laser supplies the energy at one wavelength and the laser source generates an output at a different wavelength. Nonetheless, this laser source has a relatively low output power and the advantages of this laser source has yet to be appreciated in the fiberoptics industry.

The present invention presents arrangements of DBR and DFB fiber lasers by which light output at different and specific wavelengths are generated on an optical fiber. The linewidths around these specific wavelengths are very narrow with excellent wavelength selectivity. The arrangements are miniaturized for easy installation in a fiber optic network and for stable maintenance of the laser output power and wavelength over time and changes in ambient temperature.

SUMMARY OF THE INVENTION

The present invention provides for a multiple wavelength laser source. The laser source has a pumping laser generating output at a wavelength, typically below 1500 nm, and a plurality of DBR fiber lasers or DFB fiber lasers, each having an output which is centered at a selected wavelength in the 1550 nm range. The fiber lasers are connected to the pumping laser such that the output light from said first pumping laser provides lasing energy for each of said fiber lasers. The fiber lasers may be connected serially or in series to each other. An optical fiber amplifier may be connected to the output of the serially-connected fiber lasers, or to the output of each one of the parallel-connected fiber lasers, to amplify the output from the fiber lasers so that the pumping laser provides energy for both the fiber lasers and the optical fiber amplifier.

DETAILED DESCRIPTION OF SPECIFIC EMBODIMENTS

Figure 1A:
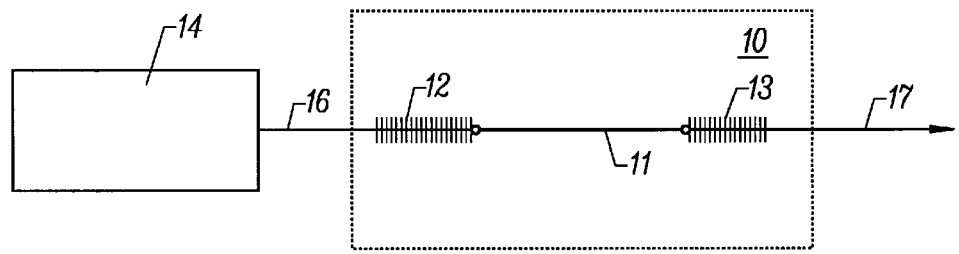
FIG. 1A is a diagram of an arrangement for a DBR fiber laser.

It should be noted that the same reference numeral is sometimes used for an element in a different arrangements in the drawings to emphasize that the element has substantially the same function or operation as that of the element in an earlier drawing, for a better understanding of the different aspects of the present invention.

FIG. 1A shows a typical arrangement of a DBR fiber laser 10 with a pumping laser source 14. The DBR fiber laser 10 is formed by a section 11 of optical fiber which has at least a portion doped with the ions of a rare-earth metal, erbium. A lasing cavity is defined by two fiber Bragg gratings 12 and 13 at either end of the optical fiber section 11. A fiber Bragg grating is created in an optical fiber by a periodic variation in the propagation constant (or the refractive index) of the fiber core, as symbolically indicated by the vertical bars in the drawings. A typical fiber Bragg grating has a very narrow reflection linewidth. The fiber Bragg gratings 12 and 13 are designed such that light in a narrow linewidth centered about the predetermined lasing wavelength $\lambda_c$ is reflected in the doped fiber section 11 between the two gratings 12 and 13. The rare-earth metal is a gain material in the fiber by which the optical signal at the reflected wavelength is amplified and finally transmitted through the grating 13 to an output fiber 17. The energy for the amplification is provided by the laser source 14, a semiconductor laser having an output centered around a pumping wavelength $\lambda_p$. The laser source 14 is connected by an optical fiber 16 to the DBR fiber laser 10.

Figure 1B:
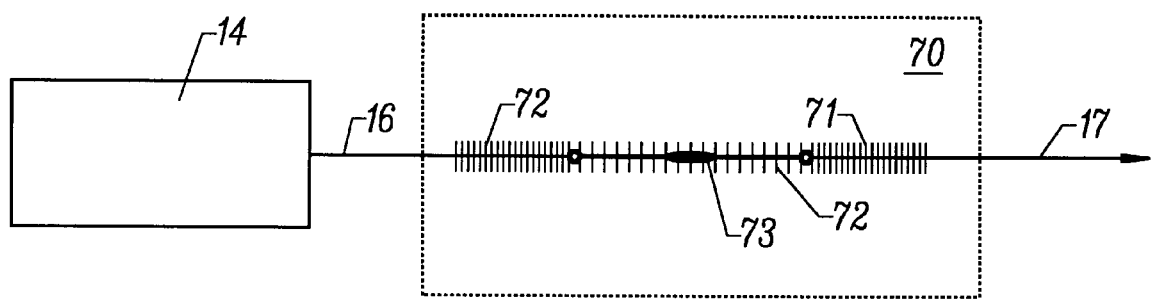
FIG. 1B is a diagram of an arrangement for a DFB fiber laser.

FIG. 1B illustrates a similar arrangement of a DFB fiber laser 70 with the same pumping laser source 14. The DFB fiber laser 70 is formed by a section 71 of optical fiber which has at least a portion doped with the ions of a rare-earth metal, erbium. A fiber Bragg grating 72 is formed in the fiber section 71 with a central phase-change region 73, which is formed by irradiating the region with UV light.

Figure 2A:
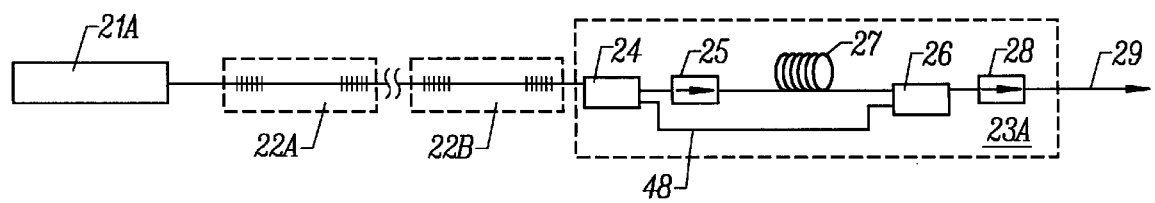
FIG. 2A is a representative diagram of a series-connected fiber laser system according to the present invention.

The present invention recognizes that the fiber lasers, such as described in FIGS. 1A and 1B, can be arranged in novel ways to create highly useful sources of optical signals, particularly for fiber optic networks. For example, FIG. 2A illustrates an arrangement of fiber lasers 22A–22B, either DBR or DFB, which are serially connected in a single mode fiber. The two lasers 22A–22B are symbolic of any plurality of series-connected fiber lasers which are energized by a single pumping laser 21A, as shown, or multiple pumping lasers. The outputs of these fiber lasers are connected to a fiber amplifier 23. The fiber Bragg gratings of each of these fiber lasers 22A–22B are centered at different wavelengths so as to generate a unique output wavelength in the 1550 nm range. The term, 1550 nm range, refers to wavelengths from about 1510 nm to 1590 nm. Wavelengths in this range are commonly used for message signals in fiberoptic networks due to the low attenuation of light in this wavelength range in present day optical fibers.

On the other hand, the output of pumping laser sources which are used to supply the energy for amplifying message signals is at an energy higher than that of the message signals. That is, the pumping laser wavelengths are shorter than those of the message signals. With message signals in the 1550 nm range, pumping laser output wavelengths are typically 800, 850, 900–970, 980, 1047, 1068 and 1480 nm from different laser sources in modern fiberoptic networks. For the pumping laser 21A of FIG. 2A, it assumed that the output wavelength is at 980 nm, as an example.

The output signals of the fiber lasers 22A–22B, are sent to an optical fiber amplifier 23A, as delineated by a dotted line in FIG. 2A. The fiber amplifier 23A has a WDM (wavelength division multiplexing) coupler 24. The WDM coupler receives light from one optical fiber and directs the light to a second optical fiber or to a third optical fiber, responsive to the wavelength of the light. The present invention uses the wavelength selectivity of the WDM coupler in the various embodiments of the present invention to direct light at different wavelengths to their proper destinations. For example, it should be noted that WDM couplers ensure that the output light of the pumping lasers, which have shorter wavelengths than the wavelengths of the message signals, do not reach the output optical fiber of the various arrangements described.

The WDM coupler 24 separates the light signals in the 1550 nm range from the output of the pumping laser 21A. The optical signals in the 1550 nm range are sent through an optical isolator 25 to one end of an erbium-doped section 27 of optical fiber. The WDM coupler 24 sends the light from the pumping laser 21A (at 980 nm wavelength, as an example) to an optical fiber 48 which is connected to a second WDM coupler 26, which is also connected to the other end of the section 27. The WDM coupler 26 transmits the 980 nm light from the fiber 48 back toward the doped section 27. On the other hand, the WDM coupler 26 transmits the message signals in the 1550 nm range, which are amplified in the section 27, to an output fiber 29. Optical isolators 25 and 28 at the output ports of the WDM couplers 24 and 26 respectively ensure that message signals are not reflected back through the WDM couplers to interfere with the operation of the amplifying section 27, or the fiber lasers 22A–22B.

In the FIG. 2A arrangement, it should be noted that one pumping laser 21A provides the energy for all the fiber lasers 22A–22B and the optical fiber amplifier 23A, which amplifies the output of all these fiber lasers.

A device in which a WDM coupler and an optical isolator are integrated is described in now abandoned U.S. appln. Ser. No. 08/470,815, entitled "INTEGRABLE FIBEROPTIC COUPLER AND RESULTING DEVICES AND SYSTEMS", and filed Jun. 6, 1995 by J. J. Pan et al. and assigned to the present assignee, and which is incorporated by reference herein. Embodiments of such devices, termed Fiber Isolator/Wavelength Division Multiplexer Combination (IWDM) or Integrated Fiber Amplifier Modules (IFAM) from E-Tek Dynamics, Inc. of San Jose, Calif., the present Assignee, have worked effectively in the present invention.

That is, an appropriate E-Tek Dynamics device may replace the WDM coupler 24 and optical isolator 25, or the WDM coupler 26 and isolator 28. Of course, other WDM couplers and optical isolators might be used.

Figure 2B:
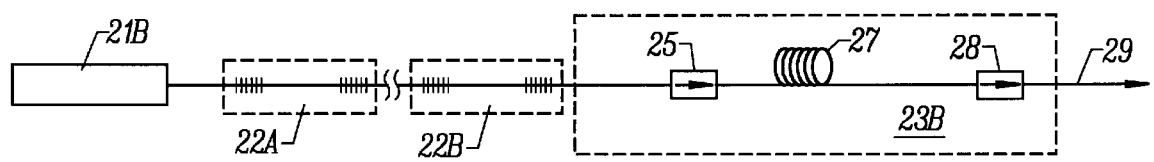
FIG. 2B is a diagram of a modified FIG. 2A system.

An alternative arrangement is illustrated in FIG. 2B in which the FIG. 2A WDM couplers 24 and 26 are removed to form a simpler optical fiber amplifier 23B. The output wavelength of the pumping laser is also changed, as indicated symbolically by a different reference number, 21B. The output wavelength of the pumping laser 21B is near the 1550 nm range, e.g., 1480 nm. This change in pumping laser wavelength minimizes the loss at this wavelength in passing through the optical isolator 25 so that maximum amplification energy is transmitted to the doped fiber section 27. Optical isolators are wavelength-sensitive to a certain extent so that a 980 nm pumping laser light suffers a loss of power in passing through the optical isolator 25, which is selected for maximum transmission of the message signals in the 1550 nm wavelength range. Thus the pumping laser output and the light from the fiber lasers 22A–22B pass directly into the section 27 through the optical isolator 25. In contrast, the WDM couplers 25 and 26 of the FIG. 2A arrangement bypasses the optical isolator 25 so that the amplifying fiber section 27 receives maximum energy from the pumping laser 21A.

Figure 3C:
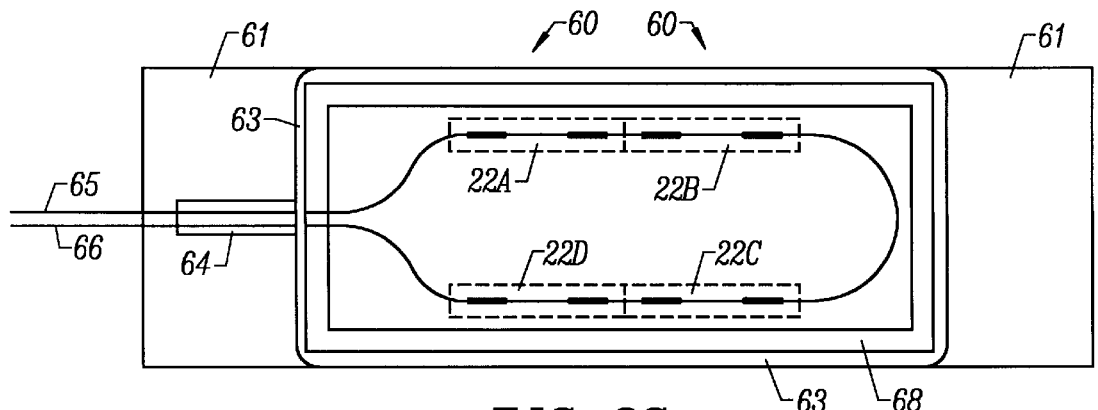
FIG. 3C is a top view of a protective package with the four lasers of the system of FIG. 3A or 3B.
Figure 3A:
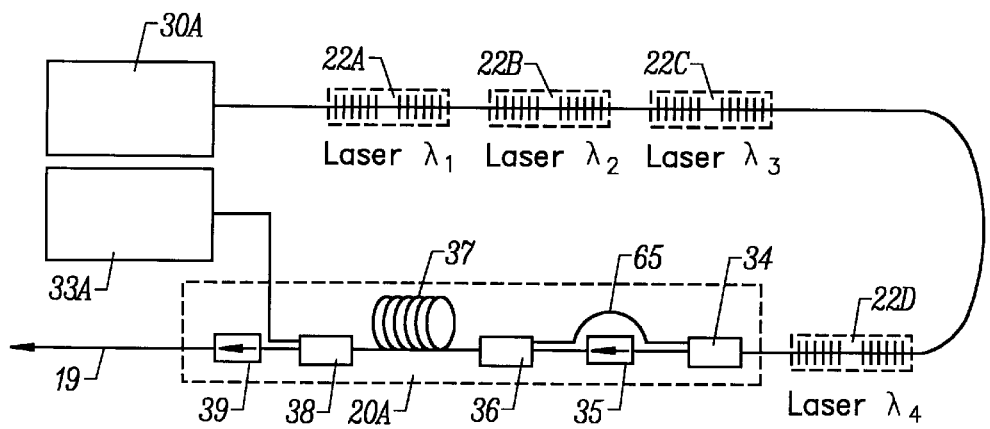
FIG. 3A is a representative diagram of a series-connected system with four fiber lasers according to one embodiment of the present invention.

FIG. 3A is a serial connection of a plurality of fiber lasers 22A–22D, four in this embodiment. A pumping laser source 30A at 980 nm output wavelength, for example, is serially connected by an optical fiber 31 to these fiber lasers 22A–22D. The first laser 22A has an output at some wavelength $\lambda 1$ in the 1550 nm range. The second fiber laser 22B operates in the same range but at a slightly different wavelength $\lambda 2$. Likewise, the third fiber laser 22C operates at another wavelength $\lambda 3$ in the 1550 nm range, while the fourth laser 22D operates at still another 1550 nm range wavelength $\lambda 4$. The output end of the fourth fiber laser 22D is connected to an erbium-doped fiber amplifier 20A, which is provided optical amplification energy from the pumping laser source 30A and a second pumping laser 33A.

The output signals of all these lasers 22A–22D are sent to a WDM coupler 34 of the optical fiber amplifier 20A. The WDM coupler 34 receives the 1550 nm message signals from the lasers 22A–22D and the 980 nm pumping laser output. The 1550 nm light is sent through an optical isolator 35 to a second WDM coupler 36. The 980 nm light which is not absorbed by the fiber lasers 22A–22D is sent directly to the WDM coupler 36 by a fiber 65 to bypass the optical isolator 35. The WDM coupler 36 combines the message and pumping light again and passes them to an erbium-doped fiber section 37. The 980 nm light provides the amplification energy for the 1550 nm range message signals in the fiber amplifier.

These amplified laser signals, after passing through the fiber section 37, reach a third WDM coupler 38. The third WDM coupler 38 also receives pumping energy at 1480 nm wavelength from the second pumping laser 33A, for example. The light from the laser 33A is directed by the WDM coupler 38 back toward the erbium-doped, or erbium/ytterbium co-doped, section 37 to increase the gain for the message laser signals passing through the section 37. The WDM coupler 38 passes the amplified signals in the 1550 nm range from the section 37 to an output optical fiber 19. An optical isolator 39 protects spurious back reflections from the output fiber 19, while the optical isolator 35 protects the WDM coupler 34 (and the fiber lasers 22A–22D) from back reflections from the WDM multiplexer 36, which could induce instability in the laser output.

It should be evident that the series-connected fiber lasers may be constructed by splicing sections of optical fibers which contain erbium-doped portions and fiber Bragg gratings. Alternatively, the series-connected fiber lasers may be formed with the erbium-doped portions and fiber Bragg gratings created in a single optical fiber. In any case, the fiber lasers are very compact elements.

As in the case of the FIG. 2B system, the optical fiber amplifier 20A of FIG. 3A can be simplified by removing the WDM couplers 34 and 36. The result is the system illustrated in FIG. 3B. The output of the pumping laser 30B is at a wavelength near the 1550 nm range of the fiber laser signals so that the power loss from the optical isolator 35 at the pumping laser output wavelength is minimal. The erbium-doped fiber section 37 receives a maximum amount of amplification energy from the pumping laser 30B. The second pumping laser 33B operates as described above but its output wavelength could be the same as, or different from, that of the first pumping laser source 30B to maximize the amplification efficiency of the fiber section 37.

FIG. 3C illustrates how the four fiber lasers 22A–22D may be fitted into a single package 60. The package 60, which may be a so-called "butterfly" package, has a base 61 with sidewalls 63 having a ledge 68 to receive a lid (not shown) to hermetically seal the fiber lasers 22A–22D within. As shown, an input/output section 64 forms a channel by which an input fiber 65 is connected to the first laser 22A and an output fiber 66 is connected to the fourth output laser 22D. Note that while four fiber lasers are discussed, other numbers of lasers may also be connected serially as shown in this patent application. Furthermore, one or more laser diodes may also be placed inside the package to fully integrate the pumping lasers into a laser source module. A laser diode assembly which is particularly suitable for integration is disclosed in U.S. appln. Ser. No. 08/361,604, entitled, "A REDUCED OPTICAL ISOLATOR MODULE FOR A MINIATURIZED LASER DIODE ASSEMBLY," filed Dec. 21, 1994 by J. J. Pan and assigned to the present assignee (now U.S. Pat. No. 5,726,801).

Figure 3B:
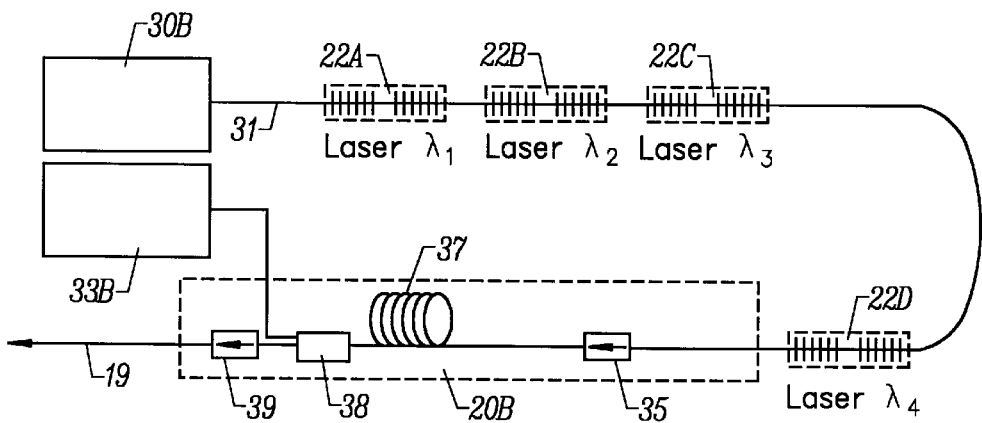
FIG. 3B is a diagram of a modified FIG. 3A system.
Figure 4:
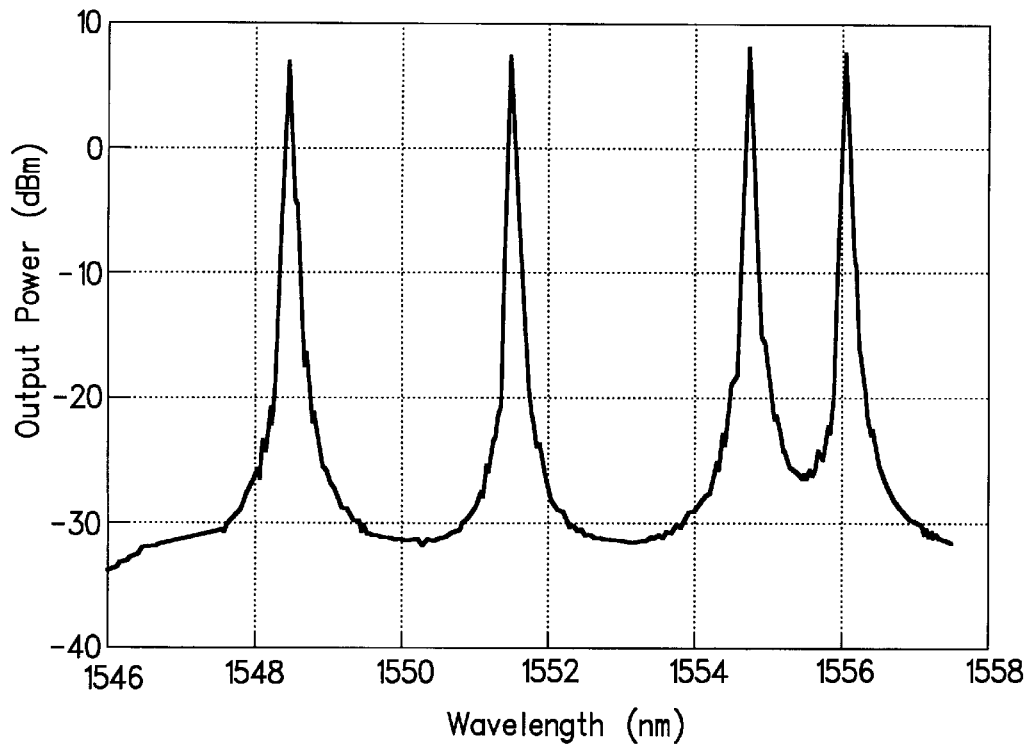
FIG. 4 is a graph plotting wavelength versus output power of a FIG. 3A system.

The arrangements illustrated in FIGS. 3A and 3B operate quite well. FIG. 4 is a graph of output power versus wavelength for an arrangement of four serially connected fiber DBR lasers as described above. It should be noted that the linewidth of each of the fiber DBR lasers is very narrow with a clear, but tight, separations between the four output peaks. The centered wavelengths, at 1548.52 nm, 1551.71 nm, 1554.94 nm and 1556.55 nm, of the four lasers are all in the 1550 nm range. Stability of the output from these lasers over time and temperature has been found to be excellent. Relative intensity noise (RIN) is low. The applicability of such combinations of fiber DBR lasers to WDM and dense WDM fiberoptic networks should be readily apparent.

Furthermore, the small size of the fiber lasers permits miniaturization of such laser sources for easy installation and maintenance of the conditions for the DBR lasers. A thermoelectric cooler can easily be adapted into the package 60 to maintain the proper operating temperatures of the DBR lasers for stability in the laser output.

Figure 5A:
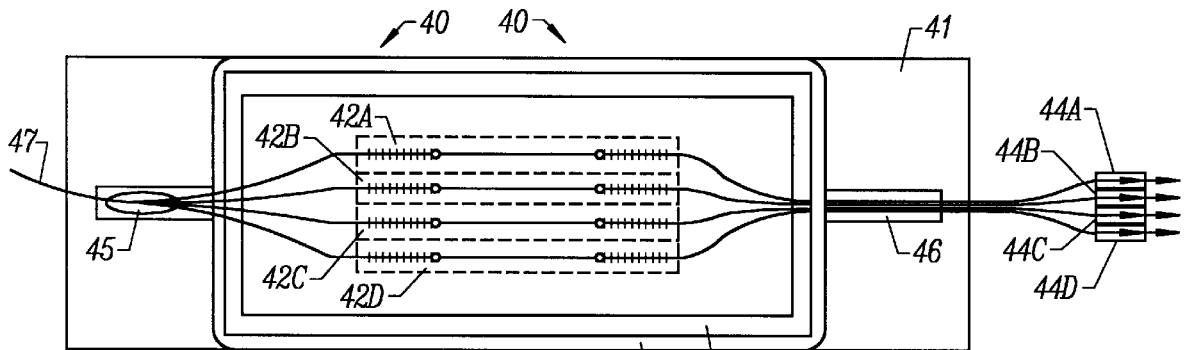
FIG. 5A is a top view of a package with four parallel-connected lasers according to another embodiment of the present invention.

Besides serially connected DBR lasers, the present invention also provides for parallel-connected lasers. FIG. 5A illustrates one arrangement in which the four lasers 42A–42D, either DBR or DFB, are connected in parallel to a single input fiber 47 by a coupler 45, such as a simple biconical fused coupling. The fiber 47 is connected to the output of a pumping laser (not shown) to provide energy to the lasers 42A–42D, which have each set of their fiber Bragg gratings setting at different peak reflection wavelengths $\lambda_c$. The fiber lasers 42A–42D are in a package 40 having a base 41 with sidewalls 43 which has a ledge to receive a lid (not shown) to form a hermetic seal on the lasers 42A–42D. The four output fibers for each of the lasers 42A–42D at different wavelengths $\lambda_c$'s are connected through an output channel 46 to individual optical isolators 44A–44D. Each of these isolators are connected to, or are part of, individual optical fiber amplifiers, as described previously. Each of the optical fiber amplifiers may not only be provided with amplification energy from the pumping laser which powers the fiber lasers 42A–42D, as illustrated in the systems in FIGS. 2A and 2B, but also provided with amplification energy from another pumping laser or lasers, as shown in the systems in FIGS. 3A and 3B.

Figure 5B:
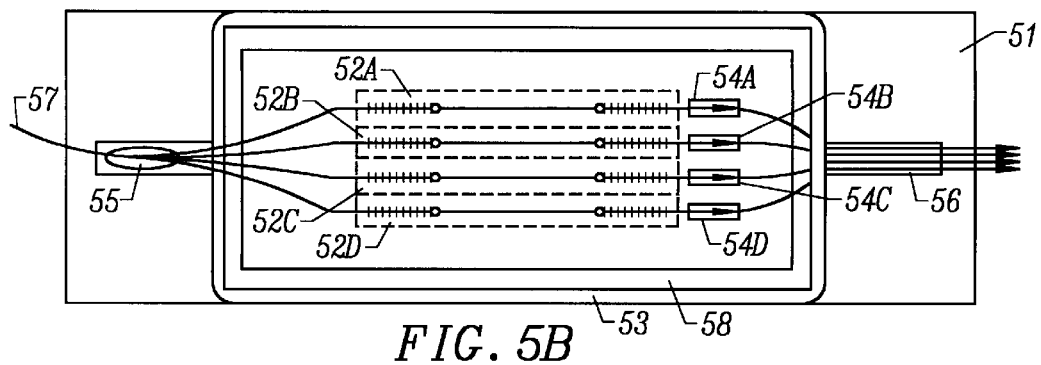
FIG. 5B is a top view of a package with four parallel-connected lasers according to still another embodiment of the present invention.

FIG. 5B illustrates another variation in which four fiber lasers 52A–52D are shown in a package 50, as discussed previously. However, in this case, the optical isolators 54A–54D are brought inside the package 50 and also hermetically sealed. The output fibers of these isolators are then connected to the exterior of the package through an outlet channel 56. Each of these output fibers may then be connected to separate optical fiber amplifiers.

Figure 6:
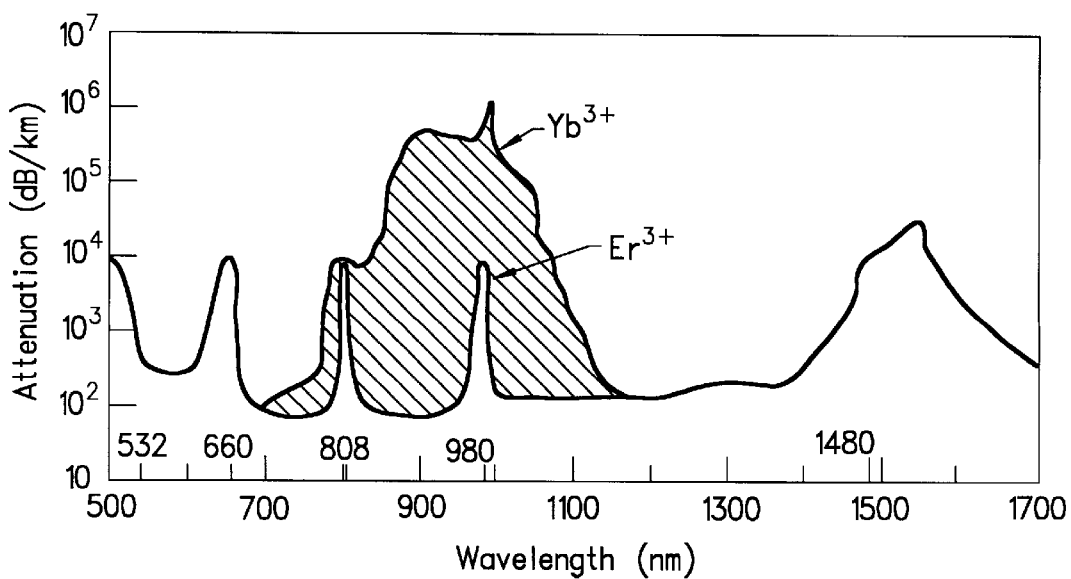
FIG. 6 is a graph illustrating the attenuation of an optical signal in an optical fiber versus the wavelength of the signal for various dopants in the optical fiber.

The optical fiber amplifier(s) at the output(s) of the different arrangements of fiber lasers, described above, provide for a gain of the output laser light. The pumping energy for the fiber lasers can also be used to pump the optical fiber amplifier, such as detailed in FIG. 3A. The present invention also recognizes that if the doped fiber sections in the fiber lasers are co-doped with ytterbium, i.e., in addition to erbium, the gain provided by these sections are significantly enhanced with an increased absorption of the pumping energy. FIG. 6 plots the attenuation of light at different wavelengths in an optical fiber co-doped with erbium and ytterbium. The absorption of light over a broad wavelength range is significantly enhanced with a co-doped optical fiber. In other words, the saturation level of an optical fiber is increased if the fiber is doped with the ions of both rare-earth elements. As shown by the shaded section in the graph, ytterbium increases the practical absorption wavelength range of an erbium-doped fiber, which is narrowly centered about 980 nm, to a broad wavelength range 800 nm to over 1100 nm. Furthermore, the height of the shaded portion indicates the large increase in absorption coefficient with the added doping of ytterbium to the erbium. This increase of the pump absorption efficiency in conjunction with high energy transfer efficiency from the ytterbium ions to erbium ions results in a significant enhancement of output power.

It should be evident that if the doped fiber sections of the optical fiber amplifiers are also co-doped with ytterbium, the gain of these fiber amplifiers may also be significantly increased. In other words, if the fiber section 27 of FIGS. 2A and 2B and fiber section 37 of FIGS. 3A and 3B were co-doped with erbium/ytterbium, the output power of their corresponding optical amplifiers may also be increased accordingly.

Furthermore, a relaxation oscillation problem which impairs laser performance has been observed in the doped sections. It has been found that if a short portion of the doped fiber section is doped with the rare-earth element, praseodymium, the relaxation oscillation is substantially dampened in the doped section.

While the description above provides a full and complete disclosure of the preferred embodiments of the present invention, various modifications, alternate constructions, and equivalents will be obvious to those with skill in the art. For example, the particular numbers of connected fiber lasers may be changed, and the serially connected fiber lasers and parallel connected fiber lasers can be interconnected to create other arrangements of multiwavelength fiber laser sources. Thus, the scope of the present invention should be limited solely by the metes and bounds of the appended claims.

What is claimed is:

1. A multiple wavelength laser source comprising
a first pumping laser generating output light;
a plurality of fiber lasers, each fiber laser having fiber Bragg gratings and an output centered at a selected wavelength, said plurality of fiber lasers connected to said first pumping laser such that said output light from said first pumping laser provides lasing energy for each of said fiber lasers, said plurality of fiber lasers connected serially, one of said fiber lasers having an end connected to said first pumping laser and another of said fiber lasers having an end connected to a first output fiber; and
an optical fiber amplifier having a first end, a second end, an erbium-doped optical fiber section therebetween and no fiber Bragg gratings, said first end of said optical fiber amplifier connected to said first output fiber and said second end of said optical fiber amplifier connected to a second output fiber.

2. The laser source of claim 1 wherein said erbium-doped fiber section is co-doped with ytterbium.

3. The laser source of claim 1 wherein said optical fiber amplifier further comprises a first optical isolator between said first end of said optical fiber amplifier and said erbium-doped fiber section; and a second optical isolator between said erbium-doped fiber section and said second end of said optical fiber amplifier.

4. The laser source of claim 3 wherein said optical fiber amplifier further comprises
a first WDM coupler having a first port connected to said first end of said optical fiber amplifier, a second port connected to said first optical isolator, and a third port, said first WDM coupler transmitting fiber laser signals from said first port to said second port, and transmitting first pumping laser output light to said third port; and
a second WDM coupler having a first port connected to said erbium-doped fiber section, a second port connected to said third port of said first WDM coupler, and a third port connected to said second optical isolator, said second WDM coupler transmitting amplified fiber laser signals from said erbium-doped fiber section from said first port to said third port, and transmitting said first pumping laser output light from said second port to said first port.

5. The laser source of claim 3 further comprising
a second pumping laser generating output light; and wherein said optical fiber amplifier further comprises
a third WDM coupler having a first port connected to said erbium-doped fiber section, a second port connected to said second optical isolator, and a third port connected to said second pumping laser, said third WDM coupler transmitting fiber laser signals from said erbium-doped section from said first port to said second port, and transmitting said second pumping laser output light from said third port to said first port.

6. The laser source of claim 5 wherein said first pumping laser generates output light at a first pumping wavelength, said plurality of fiber lasers generates output light at wavelengths different from said first pumping wavelength.

7. The laser source of claim 6 wherein said second pumping laser generates output light at a second pumping wavelength different from said first pumping wavelength.

8. The laser source of claim 6 wherein said second pumping laser generates output light at a second pumping wavelength the same as said first pumping wavelength.

9. The laser source of claim 1 further comprising a package, said package enclosing said plurality of fiber lasers.

10. The laser source of claim 1 wherein at least one of said fiber lasers comprises a fiber DBR laser.

11. The laser source of claim 10 wherein said fiber DBR laser comprises a pair of fiber Bragg gratings and an optical fiber section therebetween, said optical fiber section having at least a portion doped with erbium and ytterbium.

12. The laser source of claim 10 wherein said fiber DBR laser comprises a pair of fiber Bragg gratings and an optical fiber section therebetween, said optical fiber section having at least a portion doped with praseodymium.

13. The laser source of claim 1 wherein at least one of said fiber lasers comprises a fiber DFB laser.

14. The laser source of claim 13 wherein said fiber DFB laser comprises a fiber Bragg grating and an optical fiber section coupled therebetween, said optical fiber section having at least a portion doped with erbium and ytterbium.

15. The laser source of claim 13 wherein said fiber DFB laser comprises a fiber Bragg grating and an optical fiber section coupled therebetween, said optical fiber section having at least a portion doped with praseodymium.

16. A multiple wavelength laser source comprising
a first pumping laser generating output light; and
a plurality of fiber lasers, each fiber laser having fiber Bragg gratings and an output centered at a selected wavelength, said plurality of fiber lasers connected to said first pumping laser such that said output light from said first pumping laser provides lasing energy for each of said fiber lasers, said plurality of fiber lasers connected in parallel, each of one of said plurality of fiber lasers having a first end connected to said first pumping laser.

17. The laser source of claim 16 wherein at least one of said fiber lasers comprises a fiber DBR laser.

18. The laser source of claim 17 wherein said fiber DBR laser comprises a pair of fiber Bragg gratings and an optical fiber section therebetween, said optical fiber section having at least a portion doped with erbium and ytterbium.

19. The laser source of claim 17 wherein said fiber DBR laser comprises a pair of fiber Bragg gratings and an optical fiber section therebetween, said optical fiber section having at least a portion doped with praseodymium.

20. The laser source of claim 16 wherein at least one of said fiber lasers comprises a fiber DFB laser.

21. The laser source of claim 20 wherein said fiber DFB laser comprises a fiber Bragg grating and an optical fiber section coupled therebetween, said optical fiber section having at least a portion doped with erbium and ytterbium.

22. The laser source of claim 20 wherein said fiber DFB laser comprises a fiber Bragg grating and an optical fiber section coupled therebetween, said optical fiber section having at least a portion doped with praseodymium.

23. The laser source of claim 16 further comprising
an optical fiber amplifier having a first end, a second end, an erbium-doped optical fiber section therebetween, and no fiber Bragg gratings, said first end of said optical fiber amplifier connected to a second end of one of said fiber lasers, said second end of said optical fiber amplifier forming an output terminal of said fiber laser.

24. The laser source of claim 23 wherein said erbium-doped fiber section is co-doped with ytterbium.

25. The laser source of claim 23 further comprising a plurality of optical fiber amplifiers, each one of said optical fiber amplifiers corresponding to one of said fiber lasers, each optical fiber amplifier having a first end, a second end, a section of erbium-doped optical fiber therebetween and no fiber Bragg gratings, said first end of said optical fiber amplifier connected to a second end of one of said fiber lasers, said second end of said optical fiber amplifier forming an output terminal of said fiber laser.

26. The laser source of claim 25 wherein each of said optical fiber amplifiers comprises a first optical isolator between said first end of said optical fiber amplifier and said erbium-doped fiber section; and a second optical isolator between said erbium-doped fiber section and said second end of said optical fiber amplifier.

27. The laser source of claim 26 wherein each of said optical fiber amplifiers further comprises a first WDM coupler having a first port connected to said first end of said optical fiber amplifier, a second port connected to said first optical isolator, and a third port, said first WDM coupler transmitting fiber laser signals from said first port to said second port, and transmitting first pumping laser output light to said third port; and a second WDM coupler having a first port connected to said erbium-doped fiber section, a second port connected to said third port of said first WDM coupler, and a third port connected to said second optical isolator, said second WDM coupler transmitting amplified fiber laser signals from said erbium-doped fiber section from said first port to said third port, and transmitting said first pumping laser output light from said second port to said first port.

28. The laser source of claim 26 further comprising a plurality of second pumping lasers generating output light; and wherein each of said optical fiber amplifiers further comprises a third WDM coupler having a first port connected to said erbium-doped fiber section, a second port connected to said second optical isolator, and a third port connected to one of said second pumping lasers, said third WDM coupler transmitting fiber laser signals from said erbium-doped section from said first port to said second port, and transmitting said second pumping laser output light from said third port to said first port.

29. The laser source of claim 28 wherein said first pumping laser generates output light at a first pumping wavelength, said plurality of fiber lasers generates output light at wavelengths different from said first pumping wavelength, and said second pumping lasers generate output light at a second pumping wavelength different from said first pumping wavelength.

* * * * *